(12) United States Patent
Tanaka et al.

(10) Patent No.: US 11,898,047 B2
(45) Date of Patent: Feb. 13, 2024

(54) INK SET AND INK JET METHOD

(71) Applicant: Seiko Epson Corporation, Tokyo (JP)

(72) Inventors: Kyohei Tanaka, Matsumoto (JP); Yuko Hishida, Matsumoto (JP); Midori Sekine, Matsumoto (JP)

(73) Assignee: SEIKO EPSON CORPORATION

( * ) Notice: Subject to any disclaimer, the term of this patent is extended or adjusted under 35 U.S.C. 154(b) by 196 days.

(21) Appl. No.: 17/458,826

(22) Filed: Aug. 27, 2021

(65) Prior Publication Data

US 2022/0064467 A1 Mar. 3, 2022

(30) Foreign Application Priority Data

Aug. 28, 2020 (JP) ................. 2020-144253

(51) Int. Cl.

| | |
|---|---|
| *C09D 11/40* | (2014.01) |
| *C09D 11/107* | (2014.01) |
| *C09D 11/037* | (2014.01) |
| *B41M 5/00* | (2006.01) |
| *C09D 11/322* | (2014.01) |
| *B41J 2/21* | (2006.01) |
| *B41J 11/00* | (2006.01) |
| *C09D 11/101* | (2014.01) |

(52) U.S. Cl.
CPC ............. *C09D 11/40* (2013.01); *B41J 2/21* (2013.01); *B41J 11/002* (2013.01); *B41M 5/0023* (2013.01); *C09D 11/037* (2013.01); *C09D 11/101* (2013.01); *C09D 11/107* (2013.01); *C09D 11/322* (2013.01)

(58) Field of Classification Search
CPC ..... C09D 11/101; C09D 11/30; C09D 11/322; C09D 11/037; B41J 11/002; B41J 2/01; B41J 2/2107; B41J 11/00214
See application file for complete search history.

(56) References Cited

U.S. PATENT DOCUMENTS

2009/0214797 A1* 8/2009 Kasai ................. C09D 11/101
524/548
2013/0010039 A1* 1/2013 Kida ..................... B41J 2/2107
522/167

(Continued)

FOREIGN PATENT DOCUMENTS

| CN | 108367581 A | 8/2018 |
|---|---|---|
| JP | 2013-067770 A | 4/2013 |

*Primary Examiner* — John Zimmermann
(74) *Attorney, Agent, or Firm* — Harness, Dickey & Pierce, P.L.C.

(57) ABSTRACT

An ink set of a radiation-curable ink jet composition containing a polymerizable compound, wherein the ink set includes a color ink and a clear ink as the radiation-curable ink jet composition, the polymerizable compound contained in the clear ink contains at least one of Polymerizable monomer A1 and Polymerizable oligomer A2, Polymerizable monomer A1 having a volume of 0.26 nm$^3$ or more and an area in the direction of the height relative to a long side of 0.25 nm$^2$ or more that are defined by using the van-der-Waals radius, and a total content of Polymerizable monomer A1 and Polymerizable oligomer A2 contained in the clear ink is 80% by mass or more relative to a total amount of the polymerizable compound.

7 Claims, 1 Drawing Sheet

(56) References Cited

U.S. PATENT DOCUMENTS

| | | | |
|---|---|---|---|
| 2013/0050366 A1* | 2/2013 | Sasada | C09D 11/324 |
| | | | 977/773 |
| 2013/0065027 A1 | 3/2013 | Mochizuki et al. | |
| 2013/0295342 A1* | 11/2013 | Araki | B29C 45/14 |
| | | | 522/167 |
| 2013/0319273 A1* | 12/2013 | Vanmaele | G03F 7/027 |
| | | | 101/401.1 |
| 2014/0370214 A1* | 12/2014 | Araki | C09D 11/101 |
| | | | 428/137 |
| 2016/0326387 A1* | 11/2016 | Arita | C08F 220/68 |
| 2017/0240754 A1* | 8/2017 | Tsuchiya | B41J 2/01 |
| 2018/0002552 A1* | 1/2018 | Nakano | C09D 11/30 |
| 2018/0244933 A1* | 8/2018 | Tsuchiya | B41J 11/00214 |
| 2018/0282559 A1 | 10/2018 | Umebayashi | |
| 2021/0024761 A1* | 1/2021 | Tanaka | C09D 11/322 |

\* cited by examiner

INK SET AND INK JET METHOD

The present application is based on, and claims priority from JP Application Serial Number 2020-144253, filed Aug. 28, 2020, the disclosure of which is hereby incorporated by reference herein in its entirety.

BACKGROUND

1. Technical Field

The present disclosure relates to an ink set and an ink jet method.

2. Related Art

As described in, for example, JP-A-2013-67770, it is known that a double-layer-forming ink set realizing excellent image quality and glossiness, providing a favorable surface state, having excellent blocking resistance, and being capable of forming an image with no ground tint is obtained by including coloring ink compositions and a clear ink composition, where each coloring ink composition contains a radical-polymerizable compound containing N-vinyl compound or the like and a radical polymerization initiator, and the clear ink composition contains a radical-polymerizable compound, an acylphosphine-oxide-based radical polymerization initiator, and a surfactant at a predetermined ratio.

However, it was found that if a specific radiation-curable clear ink such as an ink set in the related art is used, the glossiness after the clear ink is applied may disappear.

SUMMARY

The present disclosure is an ink set of a radiation-curable ink jet composition containing a polymerizable compound, wherein the ink set includes a color ink and a clear ink as the radiation-curable ink jet composition, the polymerizable compound contained in the clear ink contains at least one of Polymerizable monomer A1 and Polymerizable oligomer A2, Polymerizable monomer A1 having a volume of 0.26 nm$^3$ or more and an area in the direction of the height relative to a long side of 0.25 nm$^2$ or more that are defined by using the van-der-Waals radius, and a total content of Polymerizable monomer A1 and Polymerizable oligomer A2 contained in the clear ink is 80% by mass or more relative to a total amount of the polymerizable compound.

The present disclosure is an ink jet method by using the above-described ink set, the method including a first ejecting step of ejecting the color ink from a liquid ejecting head so as to attach the color ink to a recording medium, a first curing step of applying radiation to the color ink attached to the recording medium, a second ejecting step of ejecting the clear ink from a liquid ejecting head so as to attach the clear ink to at least part of a region, to which the color ink is attached, of the recording medium, and a second curing step of applying radiation to the clear ink attached to the recording medium.

BRIEF DESCRIPTION OF THE DRAWING

FIGURE is a perspective view illustrating a serial system ink jet apparatus according to the present embodiment.

DESCRIPTION OF EXEMPLARY EMBODIMENTS

Figure 1:
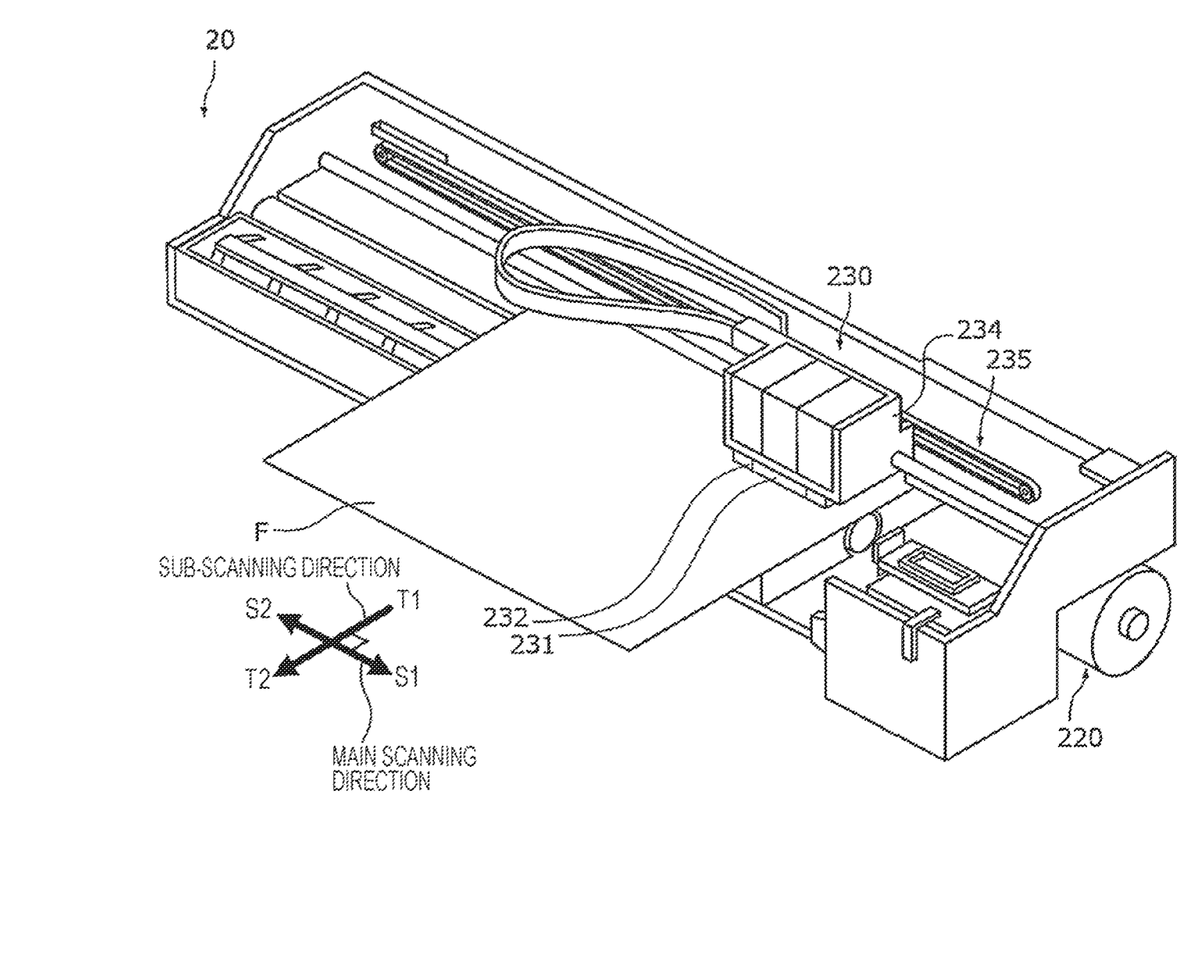

The embodiment according to the present disclosure (hereafter referred to as "the present embodiment") will be described below in detail with reference to the drawing, as the situation demands. However, the present disclosure is not limited to this and can be variously modified within the bounds of not departing from the scope of the disclosure. In this regard, in the drawing, the same elements are indicated by the same references and duplicate explanations may be omitted. The positional relationship in the vertical direction, the horizontal direction, or the like is in accord with the positional relationship illustrated in the drawing, unless otherwise specified. Further, the dimensional ratio of the drawing is not limited to the ratio illustrated in the drawing.

In the present specification, "(meth)acryloyl" denotes at least one of acryloyl and methacryloyl corresponding thereto, "(meth)acrylate" denotes at least one of acrylate and methacrylate corresponding thereto, and "(meth)acryl" denotes at least one of acryl and methacryl corresponding thereto.

1. Ink Set

The ink set according to the present embodiment is an ink set of a radiation-curable ink jet composition containing a polymerizable compound, and the radiation-curable ink jet composition includes a color ink and a clear ink.

In this regard, the radiation-curable ink jet composition in the present embodiment is a composition that is used by being ejected from an ink jet head based on the ink jet method. A radiation-curable ink composition as an embodiment of the radiation-curable ink jet composition will be described below. However, the composition according to the present embodiment may be a composition, for example, a composition used for 3D shaping, other than an ink composition.

In addition, the radiation-curable ink jet composition is cured by being irradiated with radiation. Examples of the radiation include ultraviolet rays, electron beams, infrared rays, visual light, and X-rays. The radiation may be ultraviolet rays since radiation sources are readily available and in widespread use and since materials suitable for curing by application of ultraviolet rays are readily available and in widespread use.

1.1. Clear Ink

A clear ink is a radiation-curable ink jet composition containing a polymerizable compound. In this regard, "clear ink" is not an ink used for coloring a recording medium but is an ink used for, for example, adjusting the glossiness of a recording medium. Examples of the purpose of using the clear ink include purposes of improving characteristics such as abrasion resistance of a recording medium and purposes of improving fixability and color developability of a color ink. Specifically, the clear ink is an ink composition favorably having a coloring material content of 0.2% by mass or less and more favorably containing no coloring material. On the other hand, the color ink is an ink used for coloring a recording medium and is an ink favorably having a coloring material content of more than 0.2% by mass.

According to research by the present inventors, it was found that when a clear ink is used on a color ink layer for the purpose of adjusting the glossiness of a recording medium, sufficient glossy appearance is not limited to being obtained. According to further research on this point, it was found that such a phenomenon appears when a coating film is formed from a clear ink containing relatively large amount of less bulky monomer.

On the other hand, in the present embodiment, glossy appearance is suppressed from deteriorating by using a predetermined amount of bulky Polymerizable monomer A1 or Polymerizable oligomer A2 more bulky than common polymerizable monomers. More specifically, in the present embodiment, the bulkiness of Polymerizable monomer A1 is expressed in volume and area that are defined by using the van-der-Waals radius and that serve as indices, and the clear ink containing 80% by mass or more of Polymerizable monomer A1 or Polymerizable oligomer A2 relative to the total mass of the polymerizable compound is used, Polymerizable monomer A1 having a volume of 0.26 nm$^3$ or more and an area in the direction of the height relative to a long side of 0.25 nm$^2$ or more that are defined by using the van-der-Waals radius.

Components that may be contained in the clear ink according to the present embodiment will be described below.

1.1.1. Polymerizable Compound

The polymerizable compound includes monofunctional monomers having one polymerizable functional group, polyfunctional monomers having a plurality of polymerizable functional groups, and oligomers having one or more polymerizable functional groups. One type of the polymerizable compound may be used alone, or at least two types may be used in combination.

1.1.1.1. Polymerizable Monomer A1 and Polymerizable Oligomer A2

Polymerizable monomer A1 according to the present embodiment is a polymerizable compound having a volume of 0.26 nm$^3$ or more and an area in the height direction relative to the long side of 0.25 nm$^2$ or more that are defined by using the van-der-Waals radius.

In the present embodiment, one of Polymerizable monomer A1 and Polymerizable oligomer A2 may be used, or Polymerizable monomer A1 and Polymerizable oligomer A2 may be used in combination. Of these, favorably, Polymerizable monomer A1 and Polymerizable oligomer A2 are used in combination. In particular, when Polymerizable monomer A1 and Polymerizable oligomer A2 are used in combination, the content of each of Polymerizable monomer A1 and Polymerizable oligomer A2 may be set to be within a preferable range described later. Consequently, the extendability and the glossiness of an ink are improved and, in addition, an ink smell may be further reduced.

In the present embodiment, it is assumed that an "oligomer" has a weight average molecular weight of 1,000 or more and that a "monomer" has a weight average molecular weight of less than 1,000. In this regard, there is no particular limitation regarding the upper limit of the weight average molecular weight of an oligomer, and the weight average molecular weight is 10,000 or less and preferably 5,000 or less. The weight average molecular weight herein may be measured as a mass average molecular weight in terms of styrene by using gel permeation chromatography (GPC).

1.1.1.1.1. Polymerizable Monomer A1

The volume defined by using the van-der-Waals radius of Polymerizable monomer A1 is 0.26 nm$^3$ or more, preferably 0.27 nm$^3$ or more, and more preferably 0.28 nm$^3$ or more. There is no particular limitation regarding the upper limit of the volume defined by using the van-der-Waals radius of Polymerizable monomer A1, and the volume is preferably 0.60 nm$^3$ or less, more preferably 0.55 nm$^3$ or less, and further preferably 0.50 nm$^3$ or less.

The area defined by using the van-der-Waals radius in the direction of the height relative to a long side of Polymerizable monomer A1 is 0.25 nm$^2$ or more, preferably 0.27 nm$^2$ or more, and more preferably 0.29 nm$^2$ or more. There is no particular limitation regarding the area defined by using the van-der-Waals radius in the direction of the height relative to a long side of Polymerizable monomer A1, and the area is preferably 0.50 nm$^2$ or less, more preferably 0.45 nm$^2$ or less, and further preferably 0.40 nm$^2$ or less.

The bulkiness of Polymerizable monomer A1 being within the range specified above suppresses the glossiness of the clear ink coating film from deteriorating. Regarding Polymerizable monomer A1 and Polymerizable oligomer A2, compounds satisfying the above-described bulkiness factors may be used alone or at least two types may be used in combination.

In this regard, the volume and the area in the direction of the height relative to a long side that are defined by using the van-der-Waals radius are determined as the volume and the area in the direction of the height relative to a long side of a molecular structure having the lowest energy among structural isomers of the molecule. Known software, for example, thermodynamic property estimation software, may be used for identifying a three-dimensional shape defined by using the van-der-Waals radius of a molecule and for calculating the volume and the area in the direction of the height relative to a long side based on the resulting shape.

"Volume" denotes a volume of a cavity that approximates a molecular state in a vacuum based on the chemical formula and that is formed by using the van-der-Waals radius. "Long side" denotes the longest side in a three-dimensional shape defined by using the van-der-Waals radius and is determined by calculating the distance between the farthest atoms among terminal skeleton atoms (C, O, N, and the like) when the most stable structure of the molecule is modeled. "Area in the direction of the height relative to a long side" denotes a value obtained by dividing the volume by the length of the long side and is an index of the area of the face orthogonal to the long side.

Polymerizable monomer A1 is classified into Monofunctional monomer A11 having one polymerizable functional group (hereafter also simply referred to as "Monomer A11") and Polyfunctional monomer A12 having a plurality of polymerizable functional groups (hereafter also simply referred to as "Monomer A12").

There is no particular limitation regarding Polymerizable monomer A1 above, and examples include Monofunctional monomer A11 having one polymerizable functional group such as dicyclopentenyl acrylate (DCPA), isobornyl acrylate (IBXA), 3,3,5-trimethylcyclohexyl acrylate (TMCHA), tert-butylcyclohexanol acrylate (TBCHA), isononyl acrylate (INAA), and lauryl acrylate (LA); and Polyfunctional monomer A12 having a plurality of polymerizable functional groups such as dipropylene glycol diacrylate (DPGDA).

The content of Polymerizable monomer A1 relative to the total amount of the polymerizable compound contained in the clear ink is preferably 70% by mass or more, more preferably 74% by mass or more, further preferably 78% by mass or more, and particularly preferably 80% by mass or more. The content of Polymerizable monomer A1 being 70% by mass or more tends to further improve the glossiness of the clear ink coating film. There is no particular limitation regarding the upper limit of the content of Polymerizable monomer A1, and the upper limit relative to the total amount of the polymerizable compound is preferably 99% by mass or less, more preferably 97% by mass or less, and further preferably 95% by mass or less. The content of Polymerizable monomer A1 being 99% by mass or less tends to further reduce an ink smell and to further improve the curability and the abrasion resistance.

Further, the content of Monofunctional monomer A11 relative to the total amount of Monofunctional monomer A11 and other monofunctional monomers is preferably 78% by mass or more, more preferably 80% by mass or more, and further preferably 82% by mass or more. The content of Monomer A11 being 78% by mass or more tends to further suppress the glossiness of the clear ink coating film from deteriorating. In addition, the content of Monomer A11 being within the above-described range further improves the wettability and the extendability of the clear ink on a color ink layer and enables an image having more glossy appearance to be obtained. The content of Monomer A11 relative to the total amount of the monofunctional monomers is preferably 95% by mass or less, more preferably 92% by mass or less, and further preferably 90% by mass or less. The content of Monomer A11 being 95% by mass or less tends to further improve the curability and the abrasion resistance of the resulting coating film.

The content of Polyfunctional monomer A12 relative to the total amount of the polymerizable compound contained in the clear ink is preferably from 0.5% to 7.5% by mass, more preferably from 1% to 6.0% by mass, and further preferably from 2.0% to 5.0% by mass. The content of Monomer A12 being within the above-described range tends to further reduce an ink smell and to further improve the abrasion resistance of the resulting coating film.

1.1.1.1.2. Polymerizable Oligomer A2

There is no particular limitation regarding Polymerizable oligomer A2, and examples include urethane acrylate oligomers, epoxy acrylate oligomers, and polyester acrylate oligomers. Of these, urethane acrylate oligomers are favorable. Using such Polymerizable oligomer A2 tends to improve the extendability and the glossiness of an ink and, in addition, to further reduce an ink smell.

Acrylate oligomers may be methacrylate oligomers. Herein, methacrylate oligomers are oligomers having a methacryloyl group.

There is no particular limitation regarding the urethane acrylate oligomers, and examples include polyether-based urethane acrylate oligomers having a polyether skeleton, polyester-based urethane acrylate oligomers having a polyester skeleton, and polycarbonate-based urethane acrylate oligomers having a polycarbonate skeleton. In addition, aromatic urethane acrylate oligomers and aliphatic urethane acrylate oligomers are also favorable, and aliphatic urethane acrylate oligomers are more favorable. Of these, polyether-based aliphatic urethane acrylate oligomers are particularly favorable. There is no particular limitation regarding commercially available products of such urethane acrylate oligomers, and examples include polyether-based aliphatic urethane acrylate oligomers such as CN980 (the number of functional groups of 2), CN996 (the number of functional groups of 2), CN9893 (the number of functional groups of 2), CN989 (the number of functional groups of 3), and CN968 (the number of functional groups of 6); alicyclic-group-containing urethane acrylate oligomers such as CN2920 and CN9011; polyester-based aromatic urethane acrylate oligomers such as CN971 (the number of functional groups of 3), CN972 (the number of functional groups of 3), CN978 (the number of functional groups of 2), CN9782 (the number of functional groups of 2), and CN9783 (the number of functional groups of 2); polyester-based aliphatic urethane acrylate oligomers such as CN929 (the number of functional groups of 3), CN962 (the number of functional groups of 2), CN963 (the number of functional groups of 2), CN964 (the number of functional groups of 2), CN965 (the number of functional groups of 2), CN981 (the number of functional groups of 2), CN982 (the number of functional groups of 2), CN983 (the number of functional groups of 2), CN9001 (the number of functional groups of 2), CN9002 (the number of functional groups of 2), and CN9788 (the number of functional groups of 2); polyester-based alicyclic urethane acrylate oligomers such as CN991 (the number of functional groups of 2) (all the above are produced by Sartomer); and aliphatic urethane acrylate oligomers such as EBECRYL 230 (the number of functional groups of 2), 270 (the number of functional groups of 2), 8311 (the number of functional groups of 3), 8402 (the number of functional groups of 2), 8701 (the number of functional groups of 3), 8804 (the number of functional groups of 2), 8807 (the number of functional groups of 2), 9260 (the number of functional groups of 3), 9270 (the number of functional groups of 2), KRM8200 (the number of functional groups of 6), 8296 (the number of functional groups of 3), and 8452 (the number of functional groups of 10) (the above are trade names, produced by Daicel-Cytec Co., Ltd.).

There is no particular limitation regarding the epoxy acrylate oligomers, and examples include at least one selected from the group consisting of compounds having a bisphenol A skeleton and compounds having a polyester skeleton. There is no particular limitation regarding commercially available products of such oligomers, and examples include bisphenol-A-skeleton-containing epoxy acrylate difunctional oligomers such as CN136, CN104, CN118, and CN120; and polyester-skeleton-containing epoxy acrylate difunctional oligomers such as CN2003 and CNUVE151 (all the above are produced by Sartomer).

There is no particular limitation regarding the polyester acrylate oligomers, and examples include polyester acrylate oligomers such as CN2254.

The number of polymerizable carbon-carbon double bonds included in Polymerizable oligomer A2 is from 2 to 10, preferably from 3 to 10, and more preferably from 3 to 6. The number of carbon-carbon double bonds being within the above-described range tends to further improve the extendability of the resulting coating film.

The content of Polymerizable oligomer A2 relative to the total amount of the polymerizable compound contained in the clear ink is preferably 10% by mass or less, more preferably from 1.0% to 8.0% by mass, and further preferably from 2.0% to 7.0% by mass. The content of Polymerizable oligomer A2 being within the above-described range tends to further improve the glossiness of the clear ink coating film, to further reduce an ink smell, and to further improve the curability and the abrasion resistance.

1.1.1.2 Monofunctional Monomer

In the present embodiment, the monofunctional monomer is a concept including Monofunctional monomer A11 above and other monofunctional monomers. There is no particular limitation regarding the monofunctional monomer, and examples include nitrogen-containing monofunctional monomers, monofunctional (meth)acrylates having a cross-linking condensed ring structure, aromatic-group-containing monofunctional monomers, and saturated-aliphatic-group-containing monofunctional monomers. In place of or in addition to these, other monofunctional monomers may be included, as the situation demands. There is no particular limitation regarding the monofunctional monomer, and known monofunctional monomers having a polymerizable functional group, in particular, having a polymerizable functional group including a carbon-carbon unsaturated double bond, in the related art may be used.

In the present embodiment, for example, a simple expression, saturated-aliphatic-group-containing monofunctional monomers, include saturated-aliphatic-group-containing monofunctional monomers that are Monofunctional monomer A11 and saturated-aliphatic-group-containing monofunctional monomers that are not Monofunctional monomer A11. The same applies to nitrogen-containing monofunctional monomers, monofunctional (meth)acrylates having a cross-linking condensed ring structure, aromatic-group-containing monofunctional monomers, and the like.

The content of the monofunctional monomer contained in the clear ink relative to the total amount of the polymerizable compound is preferably 80% by mass or more, more preferably 85% by mass or more, and further preferably 90% by mass or more. The content of the monofunctional monomer being 80% by mass or more relative to the total amount of the polymerizable compound further improves the extendability of the coating film. There is no particular limitation regarding the upper limit of the content of the monofunctional monomer, and the upper limit relative to the total amount of the polymerizable compound is preferably 99% by mass or less, more preferably 98% by mass or less, and further preferably 97% by mass or less. The content of the monofunctional monomer being 99% by mass or less relative to the total amount of the polymerizable compound tends to reduce an ink smell, to further improve the glossiness, and to further improve the curability and the abrasion resistance of the coating film.

The content of the monofunctional monomer contained in the clear ink relative to the total amount of the clear ink is preferably 70% by mass or more, more preferably 75% by mass or more, and further preferably 80% by mass or more. The content of the monofunctional monomer being 70% by mass or more relative to the total amount of the clear ink further improves the extendability of the coating film. The upper limit of the content of the monofunctional monomer relative to the total amount of the clear ink is preferably 95% by mass or less, more preferably 92% by mass or less, and further preferably 90% by mass or less. The content of the monofunctional monomer being 95% by mass or less relative to the total amount of the clear ink tends to reduce an ink smell, to further improve the glossiness, and to further improve the curability and the abrasion resistance of the coating film.

Examples of the monofunctional monomer will be described below, but the monofunctional monomer according to the present embodiment is not limited to the following.

1.1.1.2.1. Nitrogen-Containing Monofunctional Monomer

There is no particular limitation regarding the nitrogen-containing monofunctional monomer, and examples include nitrogen-containing monofunctional vinyl monomers such as N-vinylcaprolactam, N-vinylformaldehyde, N-vinylcarbazole, N-vinylacetamide, and N-vinylpyrrolidone; nitrogen-containing monofunctional acrylate monomers such as acryloylmorpholine; and nitrogen-containing monofunctional (meth)acrylamide monomers such as (meth)acrylamide, N-hydroxymethyl (meth)acrylamide, diacetone acrylamide, N,N-dimethyl (meth)acrylamide, and (meth) acrylamide of dimethylaminoethyl acrylate benzyl chloride quaternary and the like.

Of these, any one of nitrogen-containing monofunctional vinyl monomers and nitrogen-containing monofunctional acrylate monomers is favorably contained, a monomer having a nitrogen-containing heterocyclic structure such as N-vinylcaprolactam, N-vinylcarbazole, N-vinylpyrrolidone, or acryloylmorpholine (ACMO) is more favorable, and acryloylmorpholine is further favorably contained.

Using such nitrogen-containing monofunctional monomers tends to further improve the abrasion resistance of the coating film. In addition, nitrogen-containing monofunctional acrylate monomers having a nitrogen-containing heterocyclic structure such as acryloylmorpholine tend to further improve the extendability and the adhesiveness of the coating film.

The content of the nitrogen-containing monofunctional monomer contained in the clear ink relative to the total amount of the polymerizable compound is preferably from 2.0% to 15% by mass, more preferably from 3.0% to 13% by mass, and further preferably from 4.0% to 12% by mass. The content of the nitrogen-containing monofunctional monomer being within the above-described range relative to the total amount of the polymerizable compound tends to further improve the abrasion resistance and the adhesiveness of the coating film.

The content of the nitrogen-containing monofunctional monomer contained in the clear ink relative to the total amount of the clear ink is preferably from 2.0% to 15% by mass, more preferably from 3.0% to 12% by mass, and further preferably from 4.0% to 11% by mass. The content of the nitrogen-containing monofunctional monomer being within the above-described range relative to the total amount of the clear ink tends to further improve the abrasion resistance and the adhesiveness of the coating film.

1.1.1.2.2. Monofunctional (Meth)Acrylate Having Cross-Linking Condensed Ring Structure Examples of the monofunctional (meth)acrylate having a cross-linking condensed ring structure include dicyclopentenyl (meth) acrylate, dicyclopentenyloxyethyl (meth)acrylate, and dicyclopentanyl (meth)acrylate. The cross-linking condensed ring structure denotes a structure in which at least two cyclic structures share a side on a one-to-one basis and at least two atoms not adjacent to each other of the same cyclic structure or different cyclic structures are bonded. Examples of such a cross-linking condensed ring structure include the following in addition to the structures included in the above-described monomers.

Of these, it is more favorable that dicyclopentenyl (meth) acrylate (DCPA) corresponding to Polymerizable monomer A1 above be contained. Using such a monofunctional (meth) acrylate having a cross-linking condensed ring structure tends to further improve the abrasion resistance of the coating film and the extendability and the adhesiveness of the coating film, and, in addition, tends to further suppress the glossiness of the clear ink coating film from deteriorating.

The content of the monofunctional (meth)acrylate having a cross-linking condensed ring structure contained in the clear ink relative to the total amount of the polymerizable compound is preferably from 10% to 65% by mass, more preferably from 15% to 63% by mass, and further preferably from 20% to 60% by mass. The content of the monofunctional (meth)acrylate having a cross-linking condensed ring structure being within the above-described range relative to the total amount of the polymerizable compound tends to further improve the adhesiveness and the abrasion resistance of the coating film.

The content of the monofunctional (meth)acrylate having a cross-linking condensed ring structure contained in the clear ink relative to the total amount of the clear ink is preferably from 10% to 60% by mass, more preferably from 15% to 57% by mass, and further preferably from 20% to 55% by mass. The content of the monofunctional (meth) acrylate having a cross-linking condensed ring structure being within the above-described range relative to the total amount of the clear ink tends to further improve the adhesiveness and the abrasion resistance of the coating film.

1.1.1.2.3 Aromatic-Group-Containing Monofunctional Monomer

There is no particular limitation regarding the aromatic-group-containing monofunctional monomer, and examples include phenoxyethyl (meth)acrylate (PEA), benzyl (meth) acrylate (BZA), alkoxylated 2-phenoxyethyl (meth)acrylate, ethoxylated nonylphenyl (meth)acrylate, alkoxylated nonylphenyl (meth)acrylate, p-cumylphenol EO-modified (meth)acrylate, and 2-hydroxy-3-phenoxypropyl (meth) acrylate.

Of these, phenoxyethyl (meth)acrylate and benzyl (meth) acrylate are favorable, and phenoxyethyl acrylate (PEA) is further favorable. Using such an aromatic-group-containing monofunctional monomer tends to further improve the solubility of a photopolymerization initiator and to further improve the curability of the clear ink. In particular, when an acylphosphine-oxide-based photopolymerization initiator or a thioxanthone-based photopolymerization initiator is used, the solubility thereof tends to be improved.

The content of the aromatic-group-containing monofunctional monomer contained in the clear ink relative to the total amount of the polymerizable compound is preferably from 1% to 15% by mass, more preferably from 2% to 12% by mass, and further preferably from 3% to 11% by mass. The content of the aromatic-group-containing monofunctional monomer being within the above-described range relative to the total amount of the polymerizable compound tends to further improve the adhesiveness and the abrasion resistance of the coating film.

The content of the aromatic-group-containing monofunctional monomer contained in the clear ink relative to the total amount of the clear ink is preferably from 1% to 15% by mass, more preferably from 2% to 12% by mass, and further preferably from 3% to 11% by mass. The content of the aromatic-group-containing monofunctional monomer being within the above-described range relative to the total amount of the clear ink tends to further improve the adhesiveness and the abrasion resistance of the coating film.

1.1.1.2.4. Saturated-Aliphatic-Group-Containing Monofunctional Monomer

There is no particular limitation regarding the saturated-aliphatic-group-containing monofunctional monomer, and examples include alicyclic-group-containing (meth)acrylates such as 3,3,5-trimethylcyclohexyl (meth)acrylate, isobornyl (meth)acrylate, tert-butylcyclohexanol (meth) acrylate, 2-(meth)acrylic acid-1,4-dioxaspiro[4,5]dec-2-yl-methyl; straight-chain or branched-chain alicyclic-group-containing (meth)acrylates such as isoamyl (meth)acrylate, stearyl (meth)acrylate, lauryl (meth)acrylate, octyl (meth) acrylate, decyl (meth)acrylate, isodecyl (meth) acrylate, isomyristyl (meth) acrylate, isostearyl (meth) acrylate, 2-hydroxybutyl (meth) acrylate, butoxyethyl (meth) acrylate, tetrahydrofurfuryl (meth)acrylate, 2-hydroxyethyl (meth) acrylate, and 2-hydroxypropyl (meth)acrylate; and lactone-modified flexible (meth)acrylates. In this regard, in the present embodiment, the saturated-aliphatic-group-containing monofunctional monomer is not a compound having a cross-linking condensed ring structure.

Of these, 3,3,5-trimethylcyclohexyl acrylate (TMCHA), isobornyl acrylate (IBXA), tert-butylcyclohexanol acrylate (TBCHA), and lauryl acrylate (LA) that correspond to Polymerizable monomer A1 are favorable. Using such a saturated-aliphatic-group-containing monofunctional monomer tends to further improve the curability and the abrasion resistance of the clear ink and, in addition, tends to further suppress the glossiness of the clear ink coating film from deteriorating.

The content of the saturated-aliphatic-group-containing monofunctional monomer contained in the clear ink relative to the total amount of the polymerizable compound is preferably from 30% to 90% by mass, more preferably from 40% to 85% by mass, and further preferably from 50% to 80% by mass. The content of the saturated-aliphatic-group-containing monofunctional monomer being within the above-described range relative to the total amount of the polymerizable compound tends to further improve the curability and the abrasion resistance of the clear ink.

The content of the saturated-aliphatic-group-containing monofunctional monomer contained in the clear ink relative to the total amount of the clear ink is preferably from 30% to 85% by mass, more preferably from 40% to 80% by mass, and further preferably from 50% to 75% by mass. The content of the saturated-aliphatic-group-containing monofunctional monomer being within the above-described range relative to the total amount of the clear ink tends to further improve the curability and the abrasion resistance of the clear ink.

1.1.1.2.5. Others

Regarding monofunctional monomers other than the above, for example, unsaturated carboxylic acid such as (meth)acrylic acid, itaconic acid, crotonic acid, isocrotonic acid, and maleic acid; salts of the unsaturated carboxylic acids; esters, urethanes, amides, and anhydrides of the unsaturated carboxylic acids; acrylonitrile, styrene, various unsaturated polyesters, unsaturated polyethers, unsaturated polyamides, and unsaturated urethanes may be used.

1.1.1.3. Polyfunctional Monomer

In the present embodiment, the polyfunctional monomer is a concept including Monofunctional monomer A12 above and other polyfunctional monomers. There is no particular limitation regarding the polyfunctional monomer, and examples include vinyl-ether-group-containing (meth) acrylates and polyfunctional (meth) acrylates.

The content of the polyfunctional monomer contained in the clear ink relative to the total amount of the polymerizable compound is preferably from 0.1% to 15% by mass, more preferably from 0.5% to 10% by mass, and further preferably from 1.0% to 5.0% by mass. The content of the polyfunctional monomer being 0.1% by mass or more relative to the total amount of the polymerizable compound tends to provide excellent curability and to further improve the abrasion resistance. In addition, the content of the polyfunctional monomer being 15% by mass or less relative to the total amount of the polymerizable compound tends to further improve the extendability and the adhesiveness of the coating film.

The content of the polyfunctional monomer contained in the clear ink relative to the total amount of the clear ink is preferably from 0.1% to 15% by mass, more preferably from 0.5% to 10% by mass, and further preferably from 1.0% to 5.0% by mass. The content of the polyfunctional monomer being 0.1% by mass or more relative to the total amount of the clear ink tends to provide excellent curability and to further improve the abrasion resistance. In addition, the content of the polyfunctional monomer being 15% by mass or less relative to the total amount of the clear ink tends to further improve the extendability and the adhesiveness of the coating film.

Examples of the polyfunctional monomer will be described below, but the polyfunctional monomer according to the present embodiment is not limited to the following.

1.1.1.3.1 Vinyl-Ether-Group-Containing (Meth)Acrylate

There is no particular limitation regarding the vinyl-ether-group-containing (meth)acrylate, and examples include compounds denoted by Formula (1) below. Such a vinyl-ether-group-containing (meth)acrylate being contained tends to lower the viscosity of the clear ink and to further improve the ejection stability. In addition, the curability of the clear ink is further improved, and the recoding rate can be increased in accordance with the improvement of the curability.

$$CH_2=CR^1-COOR^2-O-CH=CH-R^3 \qquad (1)$$

(In formula (1), $R^1$ represents a hydrogen atom or a methyl group, $R^2$ represents a divalent organic residue having a carbon number of from 2 to 20, and $R^3$ represents a hydrogen atom or a monovalent organic residue having a carbon number of from 1 to 11.)

In Formula (1), examples of the divalent organic residue having a carbon number of from 2 to 20 represented by $R^2$ include a straight chain, branched, or cyclic alkylene group that may have a substituent, an alkylene group that has a carbon number of from 2 to 20, that has an oxygen atom due to an ether bond or ester bond in the structure, and that may have a substituent, and a divalent aromatic group that has a carbon number of from 6 to 11 and that may have a substituent. Of these, alkylene groups having a carbon number of from 2 to 6 such as a n-propyl group, an isopropylene group, and a butylene group and alkylene groups that have a carbon number of from 2 to 9 and that have an oxygen atom due to an ether bond in the structure such as an oxyethylene group, an oxy-n-propylene group, an oxyisopropylene group, and an oxybutylene group are favorable. Further, from the viewpoint of enabling the viscosity of the clear ink to be lowered and further improving the curability of the clear ink, compounds having a glycol ether chain in which $R^2$ is an alkylene group that has a carbon number of from 2 to 9 and that has an oxygen atom due to an ether bond in the structure such as an oxyethylene group, an oxy-n-propylene group, an oxyisopropylene group, or an oxybutylene group are more favorable.

In Formula (1), regarding the monovalent organic residue having a carbon number of from 1 to 11 represented by $R^3$, a straight chain, branched, or cyclic alkyl group that has a carbon number of from 1 to 10 and that may have a substituent and an aromatic group that has a carbon number of from 6 to 11 and that may have a substituent are suitable. Of these, an alkyl group having a carbon number of from 1 to 2 that is a methyl group or an ethyl group and an aromatic group having a carbon number of from 6 to 8 that is a phenyl group, a benzyl group, or the like is suitable for use.

When each of the above-described organic residues is a group that may have a substituent, the substituent is classified into a group having a carbon atom or a group not having a carbon atom. When the above-described substituent is a group having a carbon atom, the carbon atom is counted in the number of carbon atoms of the organic residue. Examples of the group having a carbon atom include a carboxy group and an alkoxy group, although the group is not limited to these. Examples of the group not having a carbon atom include a hydroxy group and a halogen group, although the group is not limited to these.

There is no particular limitation regarding the compounds denoted by Formula (1). Specific examples include 2-vinyloxyethyl (meth) acrylate, 3-vinyloxypropyl (meth) acrylate, 1-methyl-2-vinyloxyethyl (meth) acrylate, 2-vinyloxypropyl (meth) acrylate, 4-vinyloxybutyl (meth)acrylate, 1-methyl-3-vinyloxypropyl (meth)acrylate, 1-vinyloxymethylpropyl (meth) acrylate, 2-methyl-3-vinyloxypropyl (meth) acrylate, 1,1-dimethyl-2-vinyloxyethyl (meth) acrylate, 3-vinyloxybutyl (meth) acrylate, 1-methyl-2-vinyloxypropyl (meth) acrylate, 2-vinyloxybutyl (meth) acrylate, 4-vinyloxycyclohexyl (meth) acrylate, 6-vinyloxyhexyl (meth)acrylate, 4-vinyloxymethylcyclohexylmethyl (meth) acrylate, 3-vinyloxymethylcyclohexylmethyl (meth) acrylate, 2-vinyloxymethylcyclohexylmethyl (meth) acrylate, p-vinyloxymethylphenylmethyl (meth) acrylate, m-vinyloxymethylphenylmethyl (meth) acrylate, o-vinyloxymethylphenylmethyl (meth) acrylate, 2-(2-vinyloxyethoxy)ethyl (meth) acrylate, 2-(2-vinyloxyethoxy)ethyl acrylate, 2-(vinyloxyisopropoxy)ethyl (meth)acrylate, 2-(vinyloxyethoxy) propyl (meth)acrylate, 2-(vinyloxyethoxy) isopropyl (meth) acrylate, 2-(vinyloxyisopropoxy) propyl (meth) acrylate, 2-(vinyloxyisopropoxy) isopropyl (meth)acrylate, 2-(vinyloxyethoxyethoxy)ethyl (meth) acrylate, 2-(vinyloxyethoxyisopropoxy)ethyl (meth) acrylate, 2-(vinyloxyisopropoxyethoxy)ethyl (meth) acrylate, 2-(vinyloxyisopropoxyisopropoxy)ethyl (meth)acrylate, 2-(vinyloxyethoxyethoxy) propyl (meth) acrylate, 2-(vinyloxyethoxyisopropoxy)propyl (meth) acrylate, 2-(vinyloxyisopropoxyethoxy)propyl (meth) acrylate, 2-(vinyloxyisopropoxyisopropoxy)propyl (meth)acrylate, 2-(vinyloxyethoxyethoxy) isopropyl (meth) acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxy)isopropyl (meth) acrylate, 2-(vinyloxyethoxyethoxyethoxy)ethyl (meth) acrylate, 2-(vinyloxyethoxyethoxyethoxyethoxy)ethyl (meth) acrylate, 2-(isopropenoxyethoxy)ethyl (meth) acrylate, 2-(isopropenoxyethoxyethoxy)ethyl (meth) acrylate, 2-(isopropenoxyethoxyethoxyethoxy)ethyl (meth) acrylate, 2-(isopropenoxyethoxyethoxyethoxyethoxy)ethyl (meth) acrylate, (meth)acrylic acid polyethylene glycol monovinyl ether, and (meth)acrylic acid polypropylene glycol monovinyl ether. Of these specific examples, 2-(2-vinyloxyethoxy)ethyl acrylate is particularly favorable since the curability and the viscosity of the clear ink are readily balanced. In the present embodiment, 2-(2-vinyloxyethoxy)ethyl acrylate is also referred to as VEEA.

The content of the vinyl-ether-group-containing (meth) acrylate contained in the clear ink relative to the total amount of the polymerizable compound is preferably from 1% to 20% by mass, more preferably from 3% to 15% by mass, and further preferably from 5% to 12% by mass. The content of the vinyl-ether-group-containing (meth)acrylate being within the above-described range relative to the total amount of the polymerizable compound tends to lower the viscosity of the clear ink and to further improve the ejection stability.

The content of the vinyl-ether-group-containing (meth) acrylate contained in the clear ink relative to the total amount of the clear ink is preferably from 1% to 20% by mass, more preferably from 3% to 15% by mass, and further preferably from 5% to 12% by mass. The content of the vinyl-ether-group-containing (meth)acrylate being within the above-described range relative to the total amount of the clear ink tends to lower the viscosity of the clear ink and to further improve the ejection stability.

1.1.1.3.2. Polyfunctional (Meth)Acrylate

There is no particular limitation regarding the polyfunctional (meth)acrylate. Examples include difunctional (meth)

acrylates such as dipropylene glycol di(meth)acrylate, diethylene glycol di(meth)acrylate, triethylene glycol di(meth)acrylate, tetraethylene glycol di(meth)acrylate, polyethylene glycol di(meth)acrylate, dipropylene glycol dimethacrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, and polytetramethylene glycol di(meth)acrylate; and polyfunctional (meth)acrylates of trifunctional or higher such as trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritol ethoxy tetra(meth)acrylate, and caprolactam-modified dipentaerythritol hexa(meth)acrylate.

Of these, dipropylene glycol diacrylate (DPGDA) that corresponds to Polymerizable monomer A12 above is favorable. Using such a polyfunctional (meth)acrylate tends to further improve the curability and the abrasion resistance of the clear ink and, in addition, tends to further suppress the glossiness of the clear ink coating film from deteriorating.

The content of the polyfunctional (meth)acrylate contained in the clear ink relative to the total amount of the polymerizable compound is preferably from 1.0% to 10% by mass, more preferably from 1.0% to 7.5% by mass, and further preferably from 2.0% to 5.0% by mass. The content of the polyfunctional (meth)acrylate being 1.0% by mass or more relative to the total amount of the polymerizable compound tends to further improve the abrasion resistance. In addition, the content of the polyfunctional (meth)acrylate being 10% by mass or less relative to the total amount of the polymerizable compound tends to further improve the extendability and the adhesiveness of the coating film.

The content of the polyfunctional (meth)acrylate contained in the clear ink relative to the total amount of the clear ink is preferably from 1.0% to 10% by mass, more preferably from 1.0% to 7.5% by mass, and further preferably from 2.0% to 5.0% by mass. The content of the polyfunctional (meth)acrylate being 1.0% by mass or more relative to the total amount of the clear ink tends to further improve the abrasion resistance. In addition, the content of the polyfunctional (meth)acrylate being 10% by mass or less relative to the total amount of the clear ink tends to further improve the extendability and the adhesiveness of the coating film.

1.1.2. Photopolymerization Initiator

There is no particular limitation regarding the photopolymerization initiator provided that an active species is generated due to application of radiation, and examples include known photopolymerization initiators such as acylphosphine-oxide-based photopolymerization initiators, alkylphenon-based photopolymerization initiators, titanocene-based photopolymerization initiators, and thioxanthone-based photopolymerization initiators. Of these, acylphosphine-oxide-based photopolymerization initiators are favorable. Using such a photopolymerization initiator tends to improve the curability of the clear ink and, in particular, the curability by using a curing process with UV-LED light tends to be further improved. The photopolymerization initiators may be used alone, or at least two types may be used in combination.

There is no particular limitation regarding the acylphosphine-oxide-based photopolymerization initiator, and examples include 2,4,6-trimethylbenzoyldiphenylphosphine oxide, bis(2,4,6-trimethylbenzoyl)-phenylphosphine oxide, and bis-(2,6-dimethoxybenzoyl)-2,4,4-trimethylpentylphosphine oxide.

Examples of commercially available products of such an acylphosphine-oxide-based photopolymerization initiator include IRGACURE 819 (bis(2,4,6-trimethylbenzoyl)-phenylphosphine oxide), IRGACURE 1800 (mixture of bis-(2,6-dimethoxybenzoyl)-2,4,4-trimethylpentylphosphine oxide and 1-hydroxy-cyclohexyl-phenyl ketone at a mass ratio of 25:75), and IRGACURE TPO (2,4,6-trimethylbenzoyldiphenylphosphine oxide) (all the above are produced by BASF).

The content of the photopolymerization initiator contained in the clear ink relative to the total amount of the clear ink is preferably from 3.0% to 12% by mass, more preferably from 5.0% to 10% by mass, and further preferably from 7.0% to 9.0% by mass. The content of the photopolymerization initiator being within the above-described range tends to further improve the curability of the clear ink and the solubility of the photopolymerization initiator.

1.1.3. Other Additives

The clear ink according to the present embodiment may further contain additives such as a polymerization inhibitor and a slip agent.

1.1.3.1. Polymerization Inhibitor

The clear ink according to the present embodiment may further contain a polymerization inhibitor. The polymerization inhibitors may be used alone, or at least two types may be used in combination.

There is no particular limitation regarding the polymerization inhibitor, and examples include p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and hindered amine compounds.

The content of the polymerization inhibitor relative to the total amount of the clear ink is preferably from 0.05% to 1.0% by mass and more preferably from 0.05% to 0.5% by mass.

1.1.3.2. Slip Agent

The clear ink according to the present embodiment may further contain a slip agent. The slip agents may be used alone, or at least two types may be used in combination.

Regarding the slip agent, silicone-based surfactants are favorable, and polyester-modified silicones or polyether-modified silicones are more favorable. Examples of the polyester-modified silicone include BYK-347 and 348 and BYK-UV3500, 3510, and 3530 (the above are produced by BYK Additives & Instruments). Examples of the polyether-modified silicone include BYK-3570 (produced by BYK Additives & Instruments).

The content of slip agent relative to the total amount of the clear ink is preferably from 0.01% to 2.0% by mass and more preferably from 0.05% to 1.0% by mass.

1.2. Color Ink

A color ink is a radiation-curable ink jet composition containing a polymerizable compound. In this regard, "color ink" denotes an ink used for coloring a recording medium. The components that may be contained in the color ink according to the present embodiment will be described below.

1.2.1. Polymerizable Compound

The polymerizable compound include monofunctional monomers having one polymerizable functional group, polyfunctional monomers having a plurality of polymerizable functional groups, and oligomers having one or more polymerizable functional groups. One type of the polymerizable compound may be used alone, or at least two types may be used in combination.

1.2.1.1. Monofunctional Monomer

In the present embodiment, there is no particular limitation regarding the monofunctional monomer, and examples include nitrogen-containing monofunctional monomers, monofunctional (meth)acrylates having a cross-linking condensed ring structure, aromatic-group-containing monofunctional monomers, and saturated-aliphatic-group-containing monofunctional monomers. In place of or in addition to these, other monofunctional monomers may be included, as the situation demands. There is no particular limitation regarding the other monofunctional monomer, and known monofunctional monomers having a polymerizable functional group, in particular, having a polymerizable functional group including a carbon-carbon unsaturated double bond, in the related art may be used.

The content of the monofunctional monomer contained in the color ink relative to the total amount of the polymerizable compound is 75% by mass or more, preferably 80% by mass or more, and more preferably 85% by mass or more. The content of the monofunctional monomer being 75% by mass or more relative to the total amount of the polymerizable compound further improves the extendability of the coating film. In addition, when the content of the monofunctional monomer contained in the color ink is within the above-described range, poor glossiness tends to occur. Therefore, the present disclosure is particularly useful. There is no particular limitation regarding the upper limit of the content of the monofunctional monomer, and the upper limit relative to the total amount of the polymerizable compound is preferably 99% by mass or less, more preferably 98% by mass or less, and further preferably 97% by mass or less. The content of the monofunctional monomer being 99% by mass or less relative to the total amount of the polymerizable compound tends to further improve the abrasion resistance of the coating film.

The content of the monofunctional monomer contained in the color ink relative to the total amount of the color ink is preferably 65% by mass or more, more preferably 70% by mass or more, and further preferably 75% by mass or more. The content of the monofunctional monomer being 75% by mass or more relative to the total amount of the color ink tends to further improve the extendability of the coating film. The upper limit of the content of the monofunctional monomer relative to the total amount of the color ink is preferably 97% by mass or less, more preferably 95% by mass or less, and further preferably 90% by mass or less. The content of the monofunctional monomer being 97% by mass or less relative to the total amount of the color ink tends to further improve the curability of the coating film.

Examples of the nitrogen-containing monofunctional monomers, monofunctional (meth)acrylates having a cross-linking condensed ring structure, aromatic-group-containing monofunctional monomers, saturated-aliphatic-group-containing monofunctional monomers, and other monofunctional monomers include the same as the materials described to exemplify the monomer with respect to the clear ink.

The content of the nitrogen-containing monofunctional monomer contained in the color ink relative to the total amount of the polymerizable compound is preferably from 3.0% to 17% by mass, more preferably from 5.0% to 15% by mass, and further preferably from 8.0% to 12% by mass. The content of the nitrogen-containing monofunctional monomer being within the above-described range relative to the total amount of the polymerizable compound tends to further improve the abrasion resistance and the adhesiveness of the coating film.

The content of the nitrogen-containing monofunctional monomer contained in the color ink relative to the total amount of the clear ink is preferably from 3.0% to 17% by mass, more preferably from 5.0% to 15% by mass, and further preferably from 8.0% to 12% by mass. The content of the nitrogen-containing monofunctional monomer being within the above-described range relative to the total amount of the color ink tends to further improve the abrasion resistance and the adhesiveness of the coating film.

The content of the monofunctional (meth)acrylate having a cross-linking condensed ring structure contained in the color ink relative to the total amount of the polymerizable compound is preferably from 20% to 55% by mass, more preferably from 25% to 50% by mass, and further preferably from 30% to 50% by mass. The content of the monofunctional (meth)acrylate having a cross-linking condensed ring structure being within the above-described range relative to the total amount of the polymerizable compound tends to further improve the adhesiveness and the abrasion resistance of the coating film.

The content of the monofunctional (meth)acrylate having a cross-linking condensed ring structure contained in the color ink relative to the total amount of the color ink is preferably from 20% to 55% by mass, more preferably from 25% to 50% by mass, and further preferably from 30% to 50% by mass. The content of the monofunctional (meth) acrylate having a cross-linking condensed ring structure being within the above-described range relative to the total amount of the color ink tend to further improve the adhesiveness and the abrasion resistance of the coating film.

The content of the aromatic-group-containing monofunctional monomer contained in the color ink relative to the total amount of the polymerizable compound is preferably from 2% to 12% by mass, more preferably from 3% to 10% by mass, and further preferably from 4% to 7% by mass. The content of the aromatic-group-containing monofunctional monomer being within the above-described range relative to the total amount of the polymerizable compound tends to further improve the adhesiveness and the abrasion resistance of the coating film.

The content of the aromatic-group-containing monofunctional monomer contained in the color ink relative to the total amount of the color ink is preferably from 2% to 12% by mass, more preferably from 3% to 10% by mass, and further preferably from 4% to 7% by mass. The content of the aromatic-group-containing monofunctional monomer being within the above-described range relative to the total amount of the color ink tends to further improve the adhesiveness and the abrasion resistance of the coating film.

The content of the saturated-aliphatic-group-containing monofunctional monomer contained in the color ink relative to the total amount of the polymerizable compound is preferably from 10% to 40% by mass, more preferably from 15% to 35% by mass, and further preferably from 20% to 30% by mass. The content of the saturated-aliphatic-group-containing monofunctional monomer being within the above-described range tends to further improve the curability of the color ink.

The content of the saturated-aliphatic-group-containing monofunctional monomer contained in the color ink relative to the total amount of the color ink is preferably from 10% to 40% by mass, more preferably from 15% to 35% by mass, and further preferably from 20% to 30% by mass. The content of the saturated-aliphatic-group-containing monofunctional monomer being within the above-described range tends to further improve the curability of the color ink.

1.2.1.2. Polyfunctional Monomer

Examples of the polyfunctional monomer according to the present embodiment include vinyl-ether-group-containing (meth)acrylates and polyfunctional (meth)acrylates. In this regard, the polyfunctional monomer is not limited to the above. Examples of the polyfunctional monomer include the same as the materials described to exemplify the monomer with respect to the clear ink.

The content of the polyfunctional monomer contained in the color ink relative to the total amount of the polymerizable compound is preferably from 1.0% to 30% by mass, more preferably from 2.0% to 25% by mass, and further preferably from 3.0% to 20% by mass. The content of the polyfunctional monomer being 1.0% by mass or more relative to the total amount of the polymerizable compound tends to further improve the abrasion resistance. In addition, the content of the polyfunctional monomer being 30% by mass or less relative to the total amount of the polymerizable compound tends to further improve the extendability and the adhesiveness of the coating film.

The content of the polyfunctional monomer contained in the color ink relative to the total amount of the color ink is preferably from 1.0% to 30% by mass, more preferably from 2.0% to 25% by mass, and further preferably from 3.0% to 20% by mass. The content of the polyfunctional monomer being 1.0% by mass or more relative to the total amount of the color ink tends to further improve the abrasion resistance. In addition, the content of the polyfunctional monomer being 30% by mass or less relative to the total amount of the color ink tends to further improve the extendability and the adhesiveness of the coating film.

The content of the vinyl-ether-group-containing (meth)acrylate contained in the color ink relative to the total amount of the polymerizable compound is preferably from 1.0% to 10% by mass, more preferably from 1.0% to 7.0% by mass, and further preferably from 2.0% to 5.0% by mass. The content of the vinyl-ether-group-containing (meth)acrylate being within the above-described range relative to the total amount of the polymerizable compound tends to lower the viscosity of the color ink and to further improve the ejection stability.

The content of the vinyl-ether-group-containing (meth)acrylate contained in the color ink relative to the total amount of the color ink is preferably from 1.0% to 10% by mass, more preferably from 1.0% to 7.0% by mass, and further preferably from 2.0% to 5.0% by mass. The content of the vinyl-ether-group-containing (meth)acrylate being within the above-described range relative to the total amount of the color ink tends to lower the viscosity of the color ink and to further improve the ejection stability.

The content of the polyfunctional (meth)acrylate contained in the color ink relative to the total amount of the polymerizable compound is preferably from 1.0% to 25% by mass, more preferably from 2.0% to 20% by mass, and further preferably from 3.0% to 17% by mass. The content of the polyfunctional (meth)acrylate being 1.0% by mass or more relative to the total amount of the polymerizable compound tends to further improve the abrasion resistance. In addition, the content of the polyfunctional (meth)acrylate being 25% by mass or less relative to the total amount of the polymerizable compound tends to further improve the extendability and the adhesiveness of the coating film.

The content of the polyfunctional (meth)acrylate contained in the color ink relative to the total amount of the color ink is preferably from 1.0% to 25% by mass, more preferably from 2.0% to 20% by mass, and further preferably from 3.0% to 17% by mass. The content of the polyfunctional (meth)acrylate being 1.0% by mass or more relative to the total amount of the color ink tends to further improve the abrasion resistance. In addition, the content of the polyfunctional (meth)acrylate being 25% by mass or less relative to the total amount of the color ink tends to further improve the extendability and the adhesiveness of the coating film.

1.2.2. Photopolymerization Initiator

Examples of the photopolymerization initiator contained in the color ink include the same as the materials described to exemplify the initiator with respect to the clear ink. The content of the photopolymerization initiator relative to the total amount of the color ink is preferably from 3.0% to 12% by mass, more preferably from 5.0% to 10% by mass, and further preferably from 7.0% to 9.0% by mass. The content of the photopolymerization initiator being within the above-described range tends to further improve the curability of the color ink and the solubility of the photopolymerization initiator.

1.2.3. Coloring Material

Regarding the coloring material contained in the color ink, at least one of a pigment and a dye may be used.

The total amount of the coloring material relative to the total amount of the color ink is preferably from 0.2% to 20% by mass, more preferably from 0.5% to 15% by mass, and further preferably from 1.0% to 10% by mass.

1.2.3.1. Pigment

Using a pigment as the coloring material enables the light resistance of the color ink to be improved. Any one of an inorganic pigment and an organic pigment may be used as the pigment. The pigments may be used alone, or at least two types may be used in combination.

Regarding the inorganic pigment, carbon black (C.I. (Colour Index Generic Name) Pigment Black 7) such as furnace black, lamp black, acetylene black, or channel black, iron oxide, or titanium oxide may be used.

Examples of the organic pigment include azo pigments such as insoluble azo pigments, condensed azo pigments, azo lakes, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (for example, basic dye chelates and acidic dye chelates), dye lakes (basic dye lakes and acidic dye lakes), nitro pigments, nitroso pigments, aniline black, and daylight fluorescent pigments.

More specifically, examples of carbon black used for black include No. 2300, No. 900, MCF88, No. 33, No. 40, No. 45, No. 52, MA7, MA8, MA100, No. 2200B, and the like (the above are produced by Mitsubishi Chemical Corporation), Raven 5750, Raven 5250, Raven 5000, Raven 3500, Raven 1255, Raven 700, and the like (the above are produced by Carbon Columbia), Regal 400R, Regal 330R, Regal 660R, Mogul L, Monarch 700, Monarch 800, Monarch 880, Monarch 900, Monarch 1000, Monarch 1100, 1300, Monarch 1400, and the like (produced by CABOT JAPAN K. K.), and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (the above are produced by Degussa).

Examples of the pigment used for white include C.I. Pigment White 6, 18, and 21.

Examples of the pigment used for yellow include C.I. Pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of the pigment used for magenta include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Examples of the pigment used for cyan include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Examples of the pigment other than magenta, cyan, and yellow include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

The content of the pigment contained in the color ink relative to the total amount of the color ink is preferably from 1.0% to 20% by mass, more preferably from 1.0% to 15% by mass, and further preferably from 1.0% to 10% by mass.

1.2.3.2. Dye

A dye may be used as the coloring material. There is no particular limitation regarding the dye, and acidic dyes, direct dyes, reactive dyes, and basic dyes may be used. The dyes may be used alone, or at least two types may be used in combination.

There is no particular limitation regarding the dye, and examples include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

1.2.4. Other Additives

The color ink may further contain additives such as dispersing agents, polymerization inhibitors, and slip agents, as the situation demands.

1.2.4.1. Dispersing Agent

There is no particular limitation regarding the dispersing agent, and examples include dispersing agents commonly used for preparing pigment dispersion liquids such as polymer dispersing agents. Specific examples include dispersing agents containing at least one of polyoxyalkylenepolyalkylenepolyamines, vinyl-based polymers and copolymers, acrylic polymers and copolymers, polyesters, polyamides, polyimides, polyurethanes, amino-based polymers, silicon-containing polymers, sulfur-containing polymers, fluorine-containing polymers, and epoxy resins as a primary component. The dispersing agents may be used alone, or at least two types may be used in combination.

Examples of a commercially available product of the polymer dispersing agent include AJISPER Series produced by Ajinomoto Fine-Techno Co., Inc., Solsperse Series (Solsperse3600 and the like) available from Avecia or Noveon, DISPERBYK Series produced by BYK Additives & Instruments, and DISPARLON Series produced by Kusumoto Chemicals, Ltd.

The content of the dispersing agent contained in the color ink relative to the total amount of the color ink is preferably from 0.1% to 2.0% by mass, more preferably from 0.1% to 1.0% by mass, and further preferably from 0.1% to 0.5% by mass.

1.2.4.2. Polymerization Inhibitor

The color ink may further contain the polymerization inhibitor. The polymerization inhibitors may be used alone, or at least two types may be used in combination. Examples of the polymerization inhibitor include the same as the materials described to exemplify the inhibitor with respect to the clear ink.

The content of the polymerization inhibitor contained in the color ink relative to the total amount of the color ink is preferably from 0.05% to 1.0% by mass and more preferably from 0.05% to 0.5% by mass.

1.2.4.3. Slip Agent

The color ink may further contain the slip agent. The slip agents may be used alone, or at least two types may be used in combination. Examples of the slip agent include the same as the materials described to exemplify the agent with respect to the clear ink.

The content of the slip agent contained in the color ink relative to the total amount of the color ink is preferably from 0.01% to 2.0% by mass and more preferably from 0.05% to 1.0% by mass.

1.3. Methods for Producing Clear Ink and Color Ink

Production (preparation) of the clear ink or the color ink is performed by mixing components contained in the ink and by agitating the resulting mixture so as to sufficiently homogeneously mix the components. In the present embodiment, preparation of the clear ink or the color ink may include, in the preparation process, a step of subjecting a mixture in which the polymerization initiator and at least part of the monomer are mixed to at least one of ultrasonic treatment or heating treatment. Consequently, the amount of oxygen dissolved in the ink after preparation can be reduced, and the clear ink or the color ink having excellent ejection stability and storage stability can be produced. The above-described mixture has to contain at least the above-described components, and may further contain other components that are contained in the clear ink or the color ink. The monomer contained in the mixture is at least part of the monomer contained in the clear ink or the color ink.

2. Ink Jet Method

The ink jet method according to the present embodiment is an ink jet method by using the above-described ink set and includes a first ejecting step of ejecting the color ink from a liquid ejecting head so as to attach the color ink to a recording medium, a first applying step of applying radiation to the color ink attached to the recording medium, a second ejecting step of ejecting the clear ink from a liquid ejecting head so as to attach the clear ink to at least part of a region, to which the color ink is attached, of the recording medium, and a second applying step of applying radiation to the clear ink attached to the recording medium.

Regarding the ink jet method according to the present embodiment, using the above-described clear ink and color ink enables an image having excellent glossiness to be obtained. In addition, regarding the ink jet method according to the present embodiment, using the above-described clear ink and color ink enables an image having excellent extendability and abrasion resistance to be obtained. Each step will be described below in detail.

2.1. First Ejecting Step

In the first ejecting step, the color ink is ejected from a liquid ejecting head so as to be attached to the recording medium. More specifically, a pressure generation device is actuated so as to eject, from a nozzle, the color ink introduced into a pressure generation chamber of the liquid ejecting head. Such an ejection method is also referred to as an ink jet method.

Examples of the liquid ejecting head 10 used in the first ejecting step include a line head that performs line system recording and a serial head that performs serial system recording.

In the line system by using the line head, for example, a liquid ejecting head having a width more than or equal to the recording width of a recording medium is fixed to an ink jet apparatus. An image is recorded on the recording medium by moving the recording medium in a sub-scanning direction (longitudinal direction or transport direction of recording medium) and ejecting ink droplets from a nozzle of the liquid ejecting head in association with the movement.

In the serial system by using the serial head, for example, a liquid ejecting head is mounted on a carriage movable in the width direction of a recording medium. An image is recorded on the recording medium by moving the carriage in a main scanning direction (recording medium transverse direction or width direction) and ejecting ink droplets from a nozzle opening of the head in association with the movement.

2.2. First Applying Step

In the first applying step, radiation is applied to the color ink attached to the recording medium. When the radiation is applied, a polymerization reaction of the monomer is initiated and the color ink is cured so as to form a coating film. At this time, presence of the polymerization initiator generates active species (initiation species) of radicals, acids, bases, or the like, and the polymerization reaction of the monomer is facilitated by the function of the initiation species. In this regard, when a photosensitizer is present, an excited state is produced due to absorption of radiation, and decomposition of the polymerization initiator can be facilitated due to contact with the polymerization initiator so as to further perform a curing reaction.

In this regard, examples of the radiation include ultraviolet rays, infrared rays, visible light, and X-rays. Regarding a radiation source, the radiation is applied to the ink by using the radiation source disposed downstream of the liquid ejecting head. There is no particular limitation regarding the radiation source, and examples include ultraviolet-emitting diodes. Using such a radiation source enables size reduction and cost reduction of the apparatus to be realized. The ultraviolet-emitting diode serving as the ultraviolet source is small and, therefore, can be incorporated in an ink jet apparatus.

For example, the ultraviolet-emitting diode can be attached to a carriage (both ends in the medium width direction and/or the medium-transport direction side) on which a liquid ejecting head for ejecting a radiation-curable ink jet composition is mounted. Further, curing at low energy and high speed can be realized due to the composition of the above-described radiation-curable ink jet composition. The irradiation energy is calculated by multiplying the irradiation time by the irradiation intensity. Therefore, the irradiation time can be reduced so as to increase the printing speed. On the other hand, the irradiation intensity can also be reduced.

Consequently, since the coating film is gradually cured, a cured coating film having excellent color developability can be obtained.

2.3. Second Ejecting Step

In the second ejecting step, the clear ink is ejected from the liquid ejecting head so as to be attached to at least part of the region, to which the color ink is attached, of the recording medium. The ejection method and the head used may be the same as those in the first ejecting step.

2.4. Leveling Step

The recording method according to the present embodiment may include a leveling step of leaving the recording medium, to which the clear ink is attached, to stand between the second ejecting step and the second applying step. Since the clear ink on the color ink layer is leveled by such a step being included, the glossiness of the resulting recoded material tends to be further improved. In this regard, "leave to stand" denotes radiation in the second curing step being not applied to the recording medium, to which the clear ink is attached through the second ejecting step, and transportation and the like of the recording medium may be performed during the leveling step.

The standing time during the leveling step is preferably from 1 to 120 sec, more preferably from 2 to 100 sec, and further preferably from 4 to 80 sec. The standing time being within the above-described range sufficiently levels the clear ink on the color ink layer and, therefore, the glossiness of the resulting recorded material tends to be further improved.

2.5. Second Applying Step

In the second applying step, radiation is applied to the clear ink attached to the recording medium. In the ink jet method according to the present embodiment, using the above-described ink set suppresses the glossiness of the coating film of the clear ink from deteriorating.

3. Ink Jet Apparatus

The ink jet apparatus according to the present embodiment includes the above-described ink set, a liquid ejecting head, and a radiation source that applies radiation to a radiation-curable ink jet composition.

FIGURE is a perspective view illustrating a serial printer as an example of the ink jet apparatus. As illustrated in FIGURE, a serial printer 20 includes a transport portion 220 and a recording portion 230. The transport portion 220 transports a recording medium F fed to the serial printer to the recording portion 230 and discharges the recording medium after recording outside the serial printer. Specifically, the transport portion 220 has feed rollers and transports the fed recording medium F in the sub-scanning direction T2.

The recording portion 230 includes an ink jet head 231 for ejecting the radiation-curable ink jet composition to the recording medium F fed from the transport portion 220, a radiation source 232 for applying radiation to the radiation-curable ink jet composition attached, a carriage 234 on which the above are mounted, and a carriage movement mechanism 235 for moving the carriage 234 in the main scanning direction S1, S2 of the recording medium F.

Regarding the serial printer, a head having a length less than the width of the recording medium is included as the ink jet head 231, the head is moved, and recording is performed in a plurality of passes (multipass). In the serial printer, the head 231 and the radiation source 232 are mounted on the carriage 234 that moves in a predetermined direction, and the radiation-curable ink jet composition is ejected on the recording medium by the head 231 being moved in accordance with the movement of the carriage. Consequently, recording is performed in at least two passes (multipass). In this regard, the pass is also referred to as main scanning. Sub-scanning for transporting the recording medium is performed between a pass and a next pass. That is, main scanning and sub-scanning are alternatively performed. When the leveling step is included, it is also possible that the radiation source 232 is not actuated in the pass in which the ink jet composition is ejected from the head 231, a pass in which the head 231 is not actuated but the radiation source 232 is actuated is included after the pass in which the ink jet composition is ejected, and, thereafter, sub-scanning is performed. Alternatively, the radiation source 232 may be arranged at a position shifted from the head 231 in the sub-scanning direction, sub-scanning may be performed after a pass in which the clear ink is applied from the head 231, and a pass in which radiation is applied from the radiation source 232 to the portion provided with the clear ink may be included. Consequently, since the coating film can be cured by using the radiation source 232 after leveling of the ink jet composition is sufficiently performed, the glossiness of the coating film is improved.

FIGURE illustrates a form in which the radiation source is mounted on the carriage. However, the form is not limited to this, and a radiation source not mounted on the carriage may be included.

The ink jet apparatus according to the present embodiment is not limited to the above-described serial system printer and may be the above-described line system printer.

4. Recorded Material

The recorded material according to the present embodiment is a material in which the radiation-curable ink jet composition is attached to the recording medium and is cured. Since the ink set of the radiation-curable ink jet composition is used, an image recorded by using the above-described color ink is protected by the clear ink and has favorable glossiness. In addition, the radiation-curable ink jet composition having favorable extendability and adhesiveness suppresses the coating film from cracking or chipping when an aftertreatment such as cutting or bending is performed. Therefore, the recorded material according to the present embodiment is suitable for sign use and the like.

There is no particular limitation regarding the material for forming the recording medium, and examples include plastics such as polyvinyl chlorides, polyethylene terephthalates, polypropylenes, polyethylenes, polycarbonates, cellulose diacetate, cellulose triacetate, cellulose propionate, cellulose butyrate, cellulose acetate butyrate, cellulose nitrate, polystyrenes, and polyvinyl acetals and surface-treatment products of these, glass, paper, metal, and wood.

There is no particular limitation regarding the form of the recording medium. Examples include films, boards, and cloths.

EXAMPLES

The present disclosure will be more specifically described below with reference to the examples. The present disclosure is not limited to the following examples.

1. Preparation of Clear Ink and Color Ink

A coloring agent, a dispersing agent, and part of each monomer were weighed and placed in a pigment-dispersing tank, ceramic beads having a diameter of 1 mm were added, and agitation was performed so as to obtain a pigment dispersion liquid in which a coloring agent was dispersed in the monomers. Subsequently, the residual monomers, a polymerization initiator, and a polymerization inhibitor were placed in a mixture tank that was a stainless steel container so as to set the composition described in Table 1, and mixing and agitation were performed so as to complete dissolution. Thereafter, the pigment dispersion liquid obtained as described above was added, mixing and agitation were further performed at normal temperature for 1 hour, and filtration was performed by using a 5-μm membrane filter so as to obtain a radiation-curable ink jet composition of each example. In this regard, the numerical value of each component of each example described in Table 1 is expressed in % by mass, unless otherwise specified.

TABLE 1

| | | | Volume*1 ($nm^3$) | Length*1 (nm) | Volume/ Length ($nm^2$) | Clear ink | | | | | | | | | | Color ink | |
|---|---|---|---|---|---|---|---|---|---|---|---|---|---|---|---|---|---|
| | | | | | | 1 | 2 | 3 | 4 | 5 | 6 | 7 | 8 | 9 | 10 | 1 | 2 |
| Poly- merizable com- pound | Mono- functional monomer | TMCHA | 0.29 | 0.80 | 0.37 | 0 | 0 | 0 | 0 | 0 | 40.0 | 0 | 0 | 0 | 0 | 0 | 0 |
| | | DCPA | 0.26 | 0.90 | 0.29 | 0 | 0 | 0 | 0 | 0 | 31.3 | 40.0 | 0 | 0 | 0 | 47.1 | 32.1 |
| | | IBXA | 0.28 | 0.80 | 0.35 | 40.0 | 40.0 | 40.0 | 40.0 | 40.0 | 0 | 0 | 32.0 | 81.3 | 81.3 | 24.0 | 24.0 |
| | | TBCHA | 0.29 | 1.02 | 0.28 | 31.3 | 33.3 | 26.3 | 31.3 | 31.3 | 0 | 0 | 31.3 | 0 | 0 | 0 | 0 |
| | | LA | 0.35 | 1.38 | 0.26 | 0 | 0 | 0 | 0 | 0 | 0 | 31.3 | 0 | 0 | 0 | 0 | 0 |
| | | PEA | 0.24 | 1.10 | 0.22 | 5.0 | 5.0 | 5.0 | 5.0 | 5.0 | 5.0 | 5.0 | 10.0 | 0 | 0 | 5.0 | 5.0 |
| | | ACMO | 0.18 | 0.89 | 0.20 | 7.0 | 9.0 | 7.0 | 7.0 | 7.0 | 7.0 | 7.0 | 10.0 | 0 | 0 | 10.0 | 10.0 |
| | | BZA | 0.18 | 0.89 | 0.20 | 0 | 0 | 0 | 0 | 0 | 0 | 0 | 0 | 3.0 | 0 | 0 | 0 |
| | Poly- functional monomer | VEEA | 0.24 | 0.74 | 0.33 | 0 | 0 | 0 | 0 | 0 | 0 | 0 | 0 | 7.0 | 10.0 | 0 | 3.0 |
| | | DPGDA | 0.31 | 0.82 | 0.38 | 3.0 | 3.0 | 3.0 | 3.0 | 3.0 | 3.0 | 3.0 | 3.0 | 0 | 0 | 3.0 | 15.0 |
| | Oligomer | CN996 | | | | 5.0 | 1.0 | 10.0 | 0 | 0 | 5.0 | 5.0 | 5.0 | 0 | 0 | 0 | 0 |
| | | CN989 | | | | 0 | 0 | 0 | 5.0 | 0 | 0 | 0 | 0 | 0 | 0 | 0 | 0 |
| | | CN968 | | | | 0 | 0 | 0 | 0 | 5.0 | 0 | 0 | 0 | 0 | 0 | 0 | 0 |
| Initiator | | Irg819 | | | | 2.5 | 2.5 | 2.5 | 2.5 | 2.5 | 2.5 | 2.5 | 2.5 | 2.5 | 2.5 | 2.5 | 2.5 |
| | | TPO | | | | 5.5 | 5.5 | 5.5 | 5.5 | 5.5 | 5.5 | 5.5 | 5.5 | 5.5 | 5.5 | 5.5 | 5.5 |
| Polymerization inhibitor | | MEHQ | | | | 0.2 | 0.2 | 0.2 | 0.2 | 0.2 | 0.2 | 0.2 | 0.2 | 0.2 | 0.2 | 0.2 | 0.2 |
| Slip agent | | BYK UV3500 | | | | 0.5 | 0.5 | 0.5 | 0.5 | 0.5 | 0.5 | 0.5 | 0.5 | 0.5 | 0.5 | 0.5 | 0.5 |

TABLE 1-continued

| | | Volume*1 (nm³) | Length*1 (nm) | Volume/Length (nm²) | Clear ink 1 | 2 | 3 | 4 | 5 | 6 | 7 | 8 | 9 | 10 | Color ink 1 | 2 |
|---|---|---|---|---|---|---|---|---|---|---|---|---|---|---|---|---|
| Coloring material | PB15:3 | | | | — | — | — | — | — | — | — | — | — | — | 2.0 | 2.0 |
| Dispersing agent | solsperse 36000 | | | | — | — | — | — | — | — | — | — | — | — | 0.2 | 0.2 |
| Total | | | | | 100 | 100 | 100 | 100 | 100 | 100 | 100 | 100 | 100 | 100 | 100 | 100 |
| Content of monofunctional monomer relative to total amount of polymerizable compound (% by mass) | | | | | 91 | 96 | 86 | 91 | 91 | 91 | 91 | 91 | 89 | 89 | 97 | 80 |
| Content of Monomer A1 relative to total amount of polymerizable compound (% by mass) | | | | | 81 | 84 | 76 | 81 | 81 | 81 | 81 | 73 | 89 | 89 | 83 | 80 |
| Content of Oligomer A2 relative to total amount of polymerizable compound (% by mass) | | | | | 5 | 1 | 11 | 5 | 5 | 5 | 5 | 5 | 0 | 0 | 0 | 0 |
| Total Content of Monomer A1 and Oligomer A2 relative to total amount of polymerizable compound (% by mass) | | | | | 87 | 85 | 87 | 87 | 87 | 87 | 87 | 78 | 89 | 89 | 83 | 80 |

Abbreviations and components of products used in Table 1 are as described below.

Monofunctional Monomer
  TMCHA (trade name "Viscoat #196" produced by OSAKA ORGANIC CHEMICAL INDUSTRY LTD., 3,3,5-trimethylcyclohexyl acrylate)
  DCPA (produced by Hitachi Chemical Company, Ltd., dicyclopentenyl acrylate)
  IBXA (produced by OSAKA ORGANIC CHEMICAL INDUSTRY LTD., isobornyl acrylate)
  TBCHA (trade name "SR217" produced by Sartomer, tert-butylcyclohexanol acrylate)
  LA (trade name "LIGHT ACRYLATE L-A" produced by Kyoeisha Chemical Co., Ltd., lauryl acrylate)
  PEA (trade name "Viscoat #192" produced by OSAKA ORGANIC CHEMICAL INDUSTRY LTD., phenoxyethyl acrylate)
  ACMO (produced by KJ chemicals Corporation, acryloylmorpholine)
  BZA (trade name "Viscoat #160" produced by OSAKA ORGANIC CHEMICAL INDUSTRY LTD., benzyl acrylate) Polyfunctional monomer
  VEEA (produced by NIPPON SHOKUBAI CO., LTD., 2-(2-vinyloxyethoxy)ethyl acrylate)
  DPGDA (trade name "SR508", produced by Sartomer, dipropylene glycol diacrylate)
Oligomer
  CN996 (produced by Sartomer, polyester-based urethane acrylate oligomer, the number of functional groups of 2)
  CN989 (produced by Sartomer, polyester-based urethane acrylate oligomer, the number of functional groups of 3)
  CN968 (produced by Sartomer, polyester-based urethane acrylate oligomer, the number of functional groups of 6)
Polymerization Initiator
  Irg. 819 (trade name "IRGACURE 819" produced by BASF, bis(2,4,6-trimethylbenzoyl)-phenylphosphine oxide)
  TPO (trade name "IRGACURE TPO" produced by BASF, 2,4,6-trimethylbenzoyldiphenylphosphine oxide)
Polymerization Inhibitor
  MEHQ (trade name "p-Methoxyphenol" produced by KANTO CHEMICAL CO., INC., hydroquinone monomethyl ether)
Slip Agent
  BYK-UV3500 (produced by BYK Additives & Instruments, polyether-modified polydimethylsiloxane having an acryloyl group)
Coloring Material (Pigment)
  PB 15:3 (C.I. Pigment Blue 15:3) Dispersing agent
  Solsperse 36000 (produced by Lubrizol, polymer dispersing agent)

In Table 1, "Content of monofunctional monomer relative to total amount of polymerizable compound" indicates the content of a monofunctional monomer relative to the total amount of the polymerizable compound.

In Table 1, "Content of Monomer A1 relative to total amount of polymerizable compound" and "Content of Oligomer A2 relative to total amount of polymerizable compound" indicate the contents of Monomer A1 and Oligomer A2, respectively, relative to the total amount of the polymerizable compound. "Total Content of Monomer A1 and Oligomer A2 relative to total amount of polymerizable compound" indicates the total amount of these.

2. Ink Set

The combinations for the ink set of the clear ink and the color ink prepared as described above and the evaluation thereof are as described below.

In Table 1, "Volume" indicates the volume of the cavity formed by using the van-der-Waals radius in the state in which a molecule is suspended in a vacuum and calculated by using software "COSMOtherm" (produced by MOLSIS). More specifically, the volume of a molecule in a liquid was determined by approximating the molecular state in a vacuum and determining the three-dimensional structure of the molecule in the liquid based on the quantum-mechanical calculation.

In Table 1, "Length" indicates the longest side when "Volume" was calculated by using software "COSMOtherm" (produced by MOLSIS). More specifically, a structure in which the molecule is most stable was modulated, and the distance between the farthest atoms among the terminal skeleton atoms (C, N, O, and the like) was determined by calculation.

In Table 1, "Volume/Length" indicates the value obtained by dividing "Volume" above by "Length" above. This value is an area in the height direction relative to the long side.

TABLE 2

| | | Example | | | | | | | | | | | Comparative example | |
|---|---|---|---|---|---|---|---|---|---|---|---|---|---|---|
| | | 1 | 2 | 3 | 4 | 5 | 6 | 7 | 8 | 9 | 10 | 11 | 1 | 2 |
| | Clear ink | 1 | 2 | 3 | 4 | 5 | 6 | 7 | 2 | 7 | 9 | 10 | 8 | 8 |
| | Color ink | 1 | 1 | 1 | 1 | 1 | 1 | 1 | 2 | 2 | 1 | 1 | 1 | 2 |
| Evaluation of clear ink coating film | Extendability | A | A | B | A | A | A | A | C | C | A | A | A | C |
| | Glossiness | A | B | A | A | A | A | A | A | A | A | A | D | C |
| | Ink smell | A | B | A | A | A | A | A | A | C | C | A | A | A |

2. Evaluation Method 2.1. Evaluation of Extendability

Each color ink was applied to a vinyl chloride film (JT5829R produced by MACtac) by using a bar coater so as to have a thickness of 10 μm. Subsequently, curing was performed at energy of 400 mJ/cm² by using a metal halide lamp (produced by EYE GRAPHICS CO., LTD.) so as to form a coating film. Further, a clear ink was applied to the color ink coating film so as to have a thickness of 10 μm. Subsequently, curing was performed at energy of 400 mJ/cm² by using a metal halide lamp (produced by EYE GRAPHICS CO., LTD.) so as to form a coating film.

Release paper composed of the vinyl chloride film provided with the above-described coating film was peeled off and cut into a strip shape having a width of 1 cm and a length of 8 cm so as to produce a test piece. Regarding each test piece, the elongation percentage as the extendability was measured by using a tensile tester (TENSILON produced by ORIENTEC). The numerical value at the time of occurrence of cracking when pulling was performed at 5 mm/min was taken as the elongation percentage. The numerical value was calculated based on {(length at occurrence of cracking−length before extension)/length before extension×100}. The evaluation criteria are as described below.

Evaluation Criteria

A: 300% or more

B: 250% or more and less than 300%

C: less than 250%

2.2 Glossiness

Each color ink was applied to a polycarbonate film (Iupilon NF2000 produced by Mitsubishi Gas Chemical Company, Inc.) by using a bar coater so as to have a thickness of 10 μm. Subsequently, curing was performed at energy of 400 mJ/cm² by using UV-LED so as to form a coating film. Further, a clear ink was applied to the color ink coating film so as to have a thickness of 10 μm and was left to stand for 1 min. Subsequently, curing was performed at energy of 400 mJ/cm² by using UV-LED so as to form a coating film. The resulting coating film was visually observed at a predetermined distance, and reflection of fluorescent light from the coating film was examined. The evaluation criteria are as described below.

Evaluation Criteria

A: reflection of fluorescent light can be observed at a distance of 50 cm or more B: reflection of fluorescent light can be observed at a distance of 30 cm or more and less than 50 cm C: reflection of fluorescent light can be observed at a distance of 10 cm or more and less than 30 cm D: reflection of fluorescent light can be observed at a distance of less than 10 cm, or reflection is not observed 2.3. Evaluation of Smell of Cured Film The smell was evaluated in accordance with the following evaluation criteria by directly smelling the cured film immediately after curing of each printed material obtained when the above-described glossiness evaluation was performed.

Evaluation Criteria

A: no smell

B: a weak smell, the source of which is noticeable

C: a smell that can be readily perceived

3. Evaluation Result

Tables 1 and 2 describe the composition of the ink set used in each example and the evaluation results. As is clear from Table 1, when the ink sets of Examples 1 to 11 including the clear ink having a predetermined total content or more of Polymerizable monomer A1 and Polymerizable oligomer A2 were used, images having excellent glossiness were obtained.

What is claimed is:

1. An ink set of a radiation-curable ink jet composition containing a polymerizable compound, wherein
the ink set includes a color ink and a clear ink as the radiation-curable ink jet composition,
the polymerizable compound contained in the clear ink contains at least one of Polymerizable monomer A1 and Polymerizable oligomer A2, the Polymerizable monomer A1 having a volume of 0.26 nm³ or more and 0.60 nm³ or less, and an area in the direction of the height relative to a long side of 0.25 nm² or more and 0.50 nm² or less that are defined by using the van-der-Waals radius, and
a total content of the Polymerizable monomer A1 and the Polymerizable oligomer A2 contained in the clear ink is 80% by mass or more relative to a total amount of the polymerizable compound.

2. The ink set according to claim 1, wherein
a content of the Polymerizable oligomer A2 is 10% by mass or less relative to a total amount of the polymerizable compound contained in the clear ink.

3. The ink set according to claim 1, wherein
a content of the Polymerizable monomer A1 is 70% by mass or more relative to a total amount of the polymerizable compound contained in the clear ink.

4. The ink set according to claim 1, wherein
the polymerizable compound contained in the color ink contains a monofunctional monomer, and
a total content of the monofunctional monomer contained in the color ink is 85% by mass or more relative to a total amount of the polymerizable compound contained in the color ink.

5. The ink set according to claim 1, wherein
the Polymerizable oligomer A2 contains a urethane acrylate oligomer.

6. An ink jet method by using the ink set according to claim 1, the method comprising:
- a first ejecting step of ejecting the color ink from a liquid ejecting head so as to attach the color ink to a recording medium;
- a first curing step of applying radiation to the color ink attached to the recording medium,
- a second ejecting step of ejecting the clear ink from a liquid ejecting head so as to attach the clear ink to at least part of a region, to which the color ink is attached, of the recording medium; and
- a second curing step of applying radiation to the clear ink attached to the recording medium.

7. The ink jet method according to claim 6 comprising a leveling step of leaving the recording medium, to which the clear ink is attached, to stand between the second ejecting step and the second curing step.

\* \* \* \* \*